United States Patent
Nguyen et al.

(10) Patent No.: US 10,097,484 B2
(45) Date of Patent: Oct. 9, 2018

(54) USING SEND BUFFERS AND RECEIVE BUFFERS FOR SENDING MESSAGES AMONG NODES IN A NETWORK

(71) Applicant: INTERNATIONAL BUSINESS MACHINES CORPORATION, Armonk, NY (US)

(72) Inventors: Trung N. Nguyen, Tuscon, AZ (US); Louis A. Rasor, Tucson, AZ (US); Juan J. Ruiz, Daly City, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 357 days.

(21) Appl. No.: 14/918,898

(22) Filed: Oct. 21, 2015

(65) Prior Publication Data

US 2017/0118146 A1    Apr. 27, 2017

(51) Int. Cl.
*G06F 15/16* (2006.01)
*H04L 12/58* (2006.01)
*H04L 29/08* (2006.01)

(52) U.S. Cl.
CPC ............ *H04L 51/046* (2013.01); *H04L 51/14* (2013.01); *H04L 67/1002* (2013.01)

(58) Field of Classification Search
CPC .... H04L 51/046; H04L 51/14; H04L 67/1002
See application file for complete search history.

(56) References Cited

U.S. PATENT DOCUMENTS

| | | | |
|---|---|---|---|
| 6,292,822 B1* | 9/2001 | Hardwick | G06F 8/451 718/102 |
| 6,615,383 B1* | 9/2003 | Talluri | H04L 1/1614 714/749 |
| 8,843,651 B2 | 9/2014 | Sugumar et al. | |
| 8,868,672 B2 | 10/2014 | Hummel et al. | |
| 2005/0259662 A1* | 11/2005 | Kim | H04B 7/2637 370/395.4 |
| 2008/0034054 A1* | 2/2008 | Stehley | H04L 67/1097 709/213 |
| 2008/0082988 A1* | 4/2008 | Chow | G06F 15/163 719/313 |
| 2015/0117245 A1* | 4/2015 | Zhang | H04W 72/1284 370/252 |

* cited by examiner

*Primary Examiner* — Mohamed A Wasel
(74) *Attorney, Agent, or Firm* — David W. Victor; Konrad Raynes Davda & Victor LLP

(57) ABSTRACT

Provided are a computer program product, system, and method for using send buffers and receive buffers for sending messages among nodes in a network. A send buffer is provided for each of at least one receiving node comprising one of the nodes to which messages are sent. Each of the receiving nodes includes at least one receive buffer to receive messages from the send buffer at the sending node. A determination is made of a buffer entry for a send buffer and receive buffer pair that is available for use. Indication is made of the message in the determined buffer entry of the send buffer. The message is sent from the send buffer to the receiving node indicating the determined buffer entry in which the message is indicated to cause the receiving node to include the message in the indicated buffer entry in the receive buffer.

22 Claims, 7 Drawing Sheets

USING SEND BUFFERS AND RECEIVE BUFFERS FOR SENDING MESSAGES AMONG NODES IN A NETWORK

BACKGROUND OF THE INVENTION

1. Field of the Invention

The present invention relates to a computer program product, system, and method for using send buffers and receive buffers for sending messages among nodes in a network

2. Description of the Related Art

Nodes in a network comprised of numerous processors may send messages to each other. Each of the nodes maintains a shared memory in which messages are added by one of the many processors before being sent. A node may have a separate mail buffer for each remote node. When a processor in the node is ready to send a message, it obtains a lock to obtain a buffer entry in a mail buffer at the remote node to which the message will be sent. After obtaining the buffer entry in which the message will be written at the remote node, the processor releases a lock then calls a separate process to send the message. The called sending process obtains a lock on the mail buffer in the sending node, and copies the message from the mail buffer into a separate sending buffer, and then releases the lock. The sending process then sends the message from the sending buffer to the remote node to store at the buffer entry the processor previously obtained for the message at the remote node.

There is a need in the art for improved techniques for processors in nodes to send messages to each other.

SUMMARY

Provided are a computer program product, system, and method for using send buffers and receive buffers for sending messages among nodes in a network. A send buffer is provided for each of at least one receiving node comprising one of the nodes to which messages are sent. Each of the receiving nodes includes at least one receive buffer to receive messages from the send buffer at the sending node. The send and receive buffers for a message being sent from the sending node to one of the receiving nodes have corresponding entries. A determination is made of a buffer entry for a send buffer and receive buffer pair that is available for use to send the message. The message to send is indicated in the determined buffer entry of the send buffer. The message is sent from the send buffer to the receiving node indicating the determined buffer entry to cause the receiving node to include the message in the indicated buffer entry in the receive buffer the receiving node maintains for the node from which the message is sent.

DETAILED DESCRIPTION

In prior art node messaging schemes, the processors sending a message obtain a lock to select an available buffer entry in the buffer at the remote node to which the message will be written and a second lock to write the message to a separate send buffer from which the message will be sent to the remote node. The message is then sent to the buffer entry in a buffer at the remote node. Requiring the obtaining of multiple locks in order to send the message increases the latency of the message sending operation because processors must wait while access to the lock is serialized. This latency is exasperated in nodes having hundreds of processors, where each processor may have numerous messages to send to different nodes in the network environment.

Described embodiments provide techniques to determine a buffer entry to use for a message to add to a send buffer at the sending node and then build the message at the determined buffer entry in the send buffer. The message is sent from the send buffer to a corresponding receive buffer at the receive node to be stored in the buffer entry at the receive node. In this way, each node maintains at least one receive buffer for each remote node in which to store messages received from one of the other nodes. Further, each node maintains a send buffer corresponding to each receive buffer at the remote nodes used by the node to send messages, so that messages for a particular remote node are built in a buffer entry in the send buffer corresponding to the buffer entry in the receive buffer at which the message will be stored.

The described embodiments reduce latency by avoiding the need for the processors in a sending node to obtain a lock in order to determine a buffer entry in which the message will be built in the send buffer and avoiding the need to obtain a lock to send the message from the send buffer.

Figure 1:
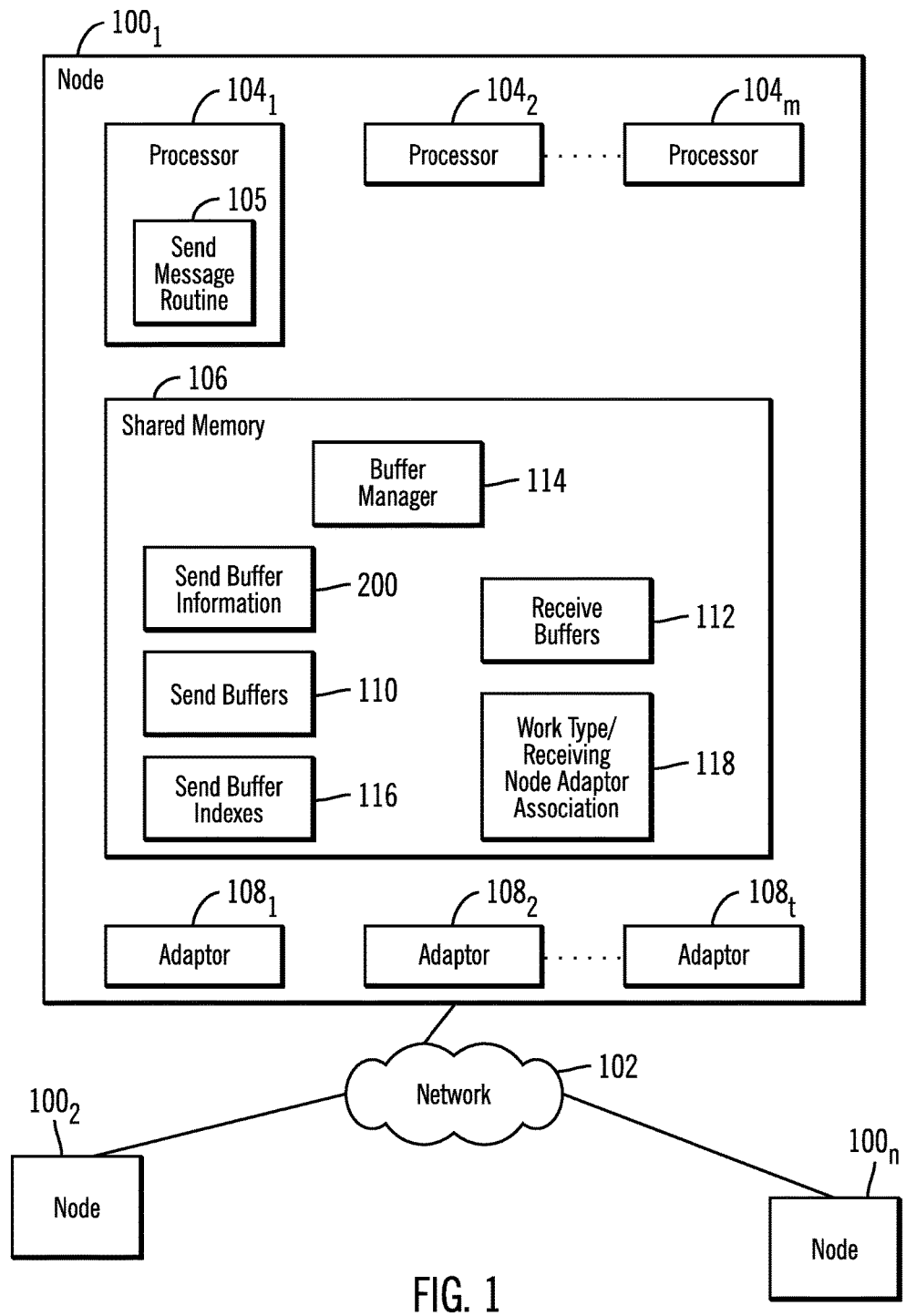
FIG. 1 illustrates an embodiment of a network node messaging environment.

FIG. 1 illustrates an embodiment of a network computing environment having a plurality of processing nodes $100_1$, $100_2 \ldots 100_n$ that communicate over a network 102. Each of the nodes $100_1$, $100_2 \ldots 100_n$ may include the components shown with respect to node $100_1$, including a plurality of processors $104_1$, $104_2 \ldots 104_m$, a shared memory 106 accessible to all the processors $104_1$, $104_2 \ldots 104_m$, and a plurality of network adaptors $108_1$, $108_2 \ldots 108_t$, to provide different connections to the network 102. In certain embodiments, the nodes $100_1$, $100_2 \ldots 100_n$ may have a couple hundred or more processors.

The shared memory 106 includes a buffer manager 114 that manages send buffers 110 maintained to buffer messages the processors $104_1$, $104_2 \ldots 104_m$ are sending to receiving nodes comprising the other nodes $100_1$, $100_2 \ldots 100_n$. Receive buffers 112 receive messages from other nodes to process. Each of the send buffers 110 corresponds to one receive buffer 112 on another node, and has a same number of corresponding buffer entries as those in the corresponding receive buffer 112 at another node. Buffers 110, 112 may each have hundreds of entries. A node $100_i$, maintains one send buffer 110 for each receive buffer on another of the nodes $100_1, 100_2 \ldots 100_n$ to which messages are sent. Thus, for each pair of nodes $100_i$ and $100_j$, there is pair of send and receive buffers, such that the nodes $100_i$ and $100_j$ have a send buffer $110_i, 110_j$ in which to build messages being sent to a corresponding receive buffer $112_i, 112_j$ at the remote node $100_j, 100_i$, respectively. The buffer manager 114 accesses messages from the receive buffers 112 to route to one of their processors $104_1, 104_2 \ldots 104_m$ to process. Each of the processors $104_1, 104_2 \ldots 104_m$ include a send message routine 105, shown with respect to processor $104_1$ that is executed to send a message to a remote node $100_1, 100_2 \ldots 100_n$.

The buffer manager 114 maintains send buffer information 200 having information on the send buffers 110 and send buffer indexes 116. There may be one index 116 of entries for each send buffer 110 used to send messages to one remote node $100_1, 100_2 \ldots 100_n$. The index 116 includes an entry for each buffer entry in the send and receive buffer pair with which the index 116 is associated. The send buffer 112 for one receive buffer 114 on another of the nodes $100_1, 100_2 \ldots 100_n$ has a same number of entries as the corresponding receiving buffer 114. There may be one or more receive 112 and send 100 buffer pairs for each pair of nodes. In one embodiment, there may be a pair of send and receive buffers for each adaptor $108_1, 108_2 \ldots 108_t$ on the receiving node with which the sending node may communicate.

The send buffer manager 114 may further maintain an association 118 of work types to adaptors $108_1, 108_2 \ldots 108_t$ for each of the receiving nodes, such that a message concerning a particular type of work is routed to the adaptor $108_1, 108_2 \ldots 108_t$ on the receiving node corresponding to that type of work. A type of work may comprise an application with which the message is associated, such as a database operation, workflow operation, backup operation, replication operation, failover/failback coordination, cloud service, software service, web service, etc.

The memory 106 may comprise suitable volatile or non-volatile memory devices, such as a solid state storage device (SSD) comprised of solid state electronics, EEPROM (Electrically Erasable Programmable Read-Only Memory), flash memory, flash disk, Random Access Memory (RAM) drive, DRAM, storage-class memory (SCM), Phase Change Memory (PCM), resistive random access memory (RRAM), spin transfer torque memory (STM-RAM), conductive bridging RAM (CBRAM), magnetic hard disk drive, etc.

The network 102 may comprise a Storage Area Network (SAN), a Local Area Network (LAN), a Wide Area Network (WAN), the Internet, and Intranet, etc. Alternatively, the nodes $100_1, 100_2 \ldots 100_n$ may connect over a bus interface, such as a Peripheral Component Interconnect (PCI) bus interface and other interfaces known in the art.

Figure 2:
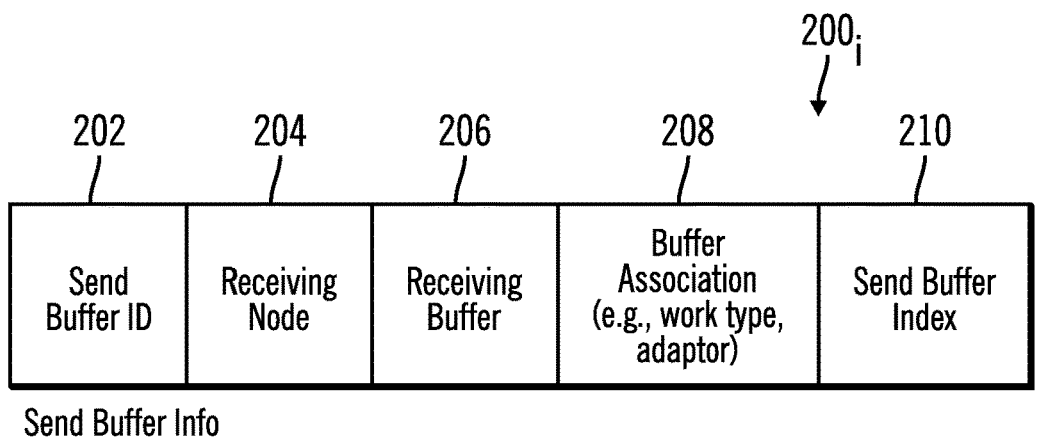
FIG. 2 illustrates an embodiment of send buffer information for each send buffer at a node.

FIG. 2 illustrates an embodiment of an instance of send buffer information $200_i$ maintained for each of the send buffers 110, and includes a send buffer identifier (ID) 202 identifying the send buffer $110_i$, in the shared memory 106; a receiving node 204 having the receive buffer 206 with which the send buffer 202 is associated; and a buffer association indicating some element associated with the send buffer 202, such as a type of work, adaptor, etc. with which the send buffer 202 is associated; and a send buffer index 210 identifying the send buffer index $116_i$ providing entries in the send buffer 202 to use.

Figure 3:
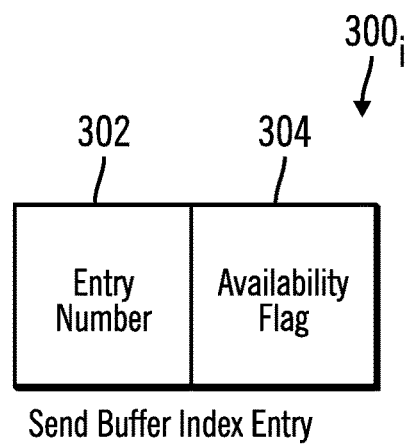
FIG. 3 illustrates an embodiment of a send buffer index entry.

FIG. 3 illustrates an embodiment of a send buffer index entry $300_i$ in one of the send buffer indexes 116, including an entry number 302 corresponding to an entry in a send 110 and receive buffer 112 pair and an availability flag 304 indicating whether the entry 302 in the send and receive buffer pair is available for use.

Figure 4:
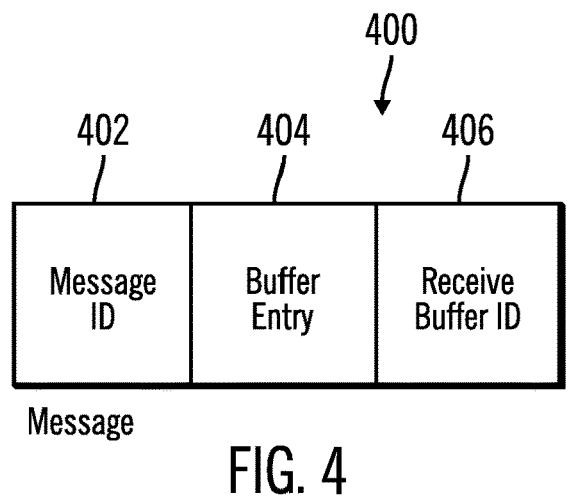
FIG. 4 illustrates an embodiment of a message.

FIG. 4 illustrates an embodiment of a message 400 built in a buffer entry in one of the send buffers 110 to send to a corresponding receive buffer 112, including a message identifier (ID) 402, a buffer entry 404 identifying the number of the buffer entry used in the send 110 and receive 112 buffer pair, and a receive buffer identifier 406 identifying the receive buffer 112 in which the message 400 will be stored.

Figure 5:
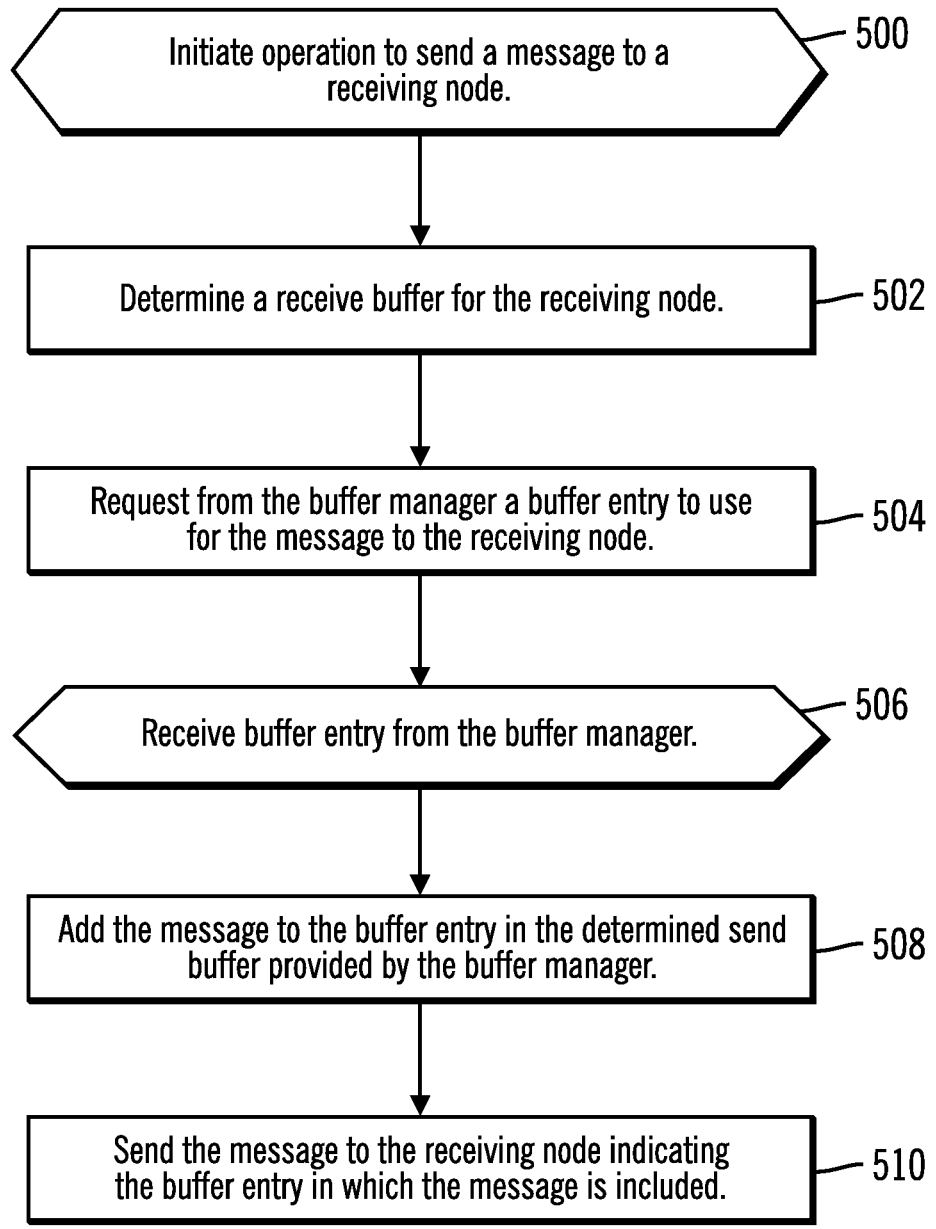
FIG. 5 illustrates an embodiment of operations to send a message to a receiving node.

FIG. 5 illustrates an embodiment of operations performed by the send message routine 105 executing in the processors $104_1, 104_2 \ldots 104_m$ to send a message. Upon initiating (at block 500) in a sending node $100_s$, an operation to send a message 400 to a receiving node $100_r$, the send message routine 105 determines (at block 502) a receive $112_r$ buffer at the receiving node $100_r$ to which the message should be sent, which corresponds to a send buffer $110_s$ at the sending node $100_s$. The send message routine 105 requests (at block 504) from the buffer manager 114 a buffer entry in the send and receive buffer pair to use for the message 400 to send to the receiving node $100_r$. Upon receiving (at block 506) a buffer entry from the buffer manager 114, the message 400 is generated and added (at block 508) to the returned buffer entry from the buffer manager 114 in the send buffer $110_s$ corresponding to the receive buffer $112_r$ at the receiving node $100_r$ to which the message is to be sent. The message 400 is sent (at block 510) from the entry in the send buffer $110_s$ at the sending node $100_s$ to the receiving node $100_r$, indicating the buffer entry 404 and the receive buffer ID 406 having the identifier of receive buffer $112_r$ in which the message will be stored at the receiving node $100_r$.

Figure 6:
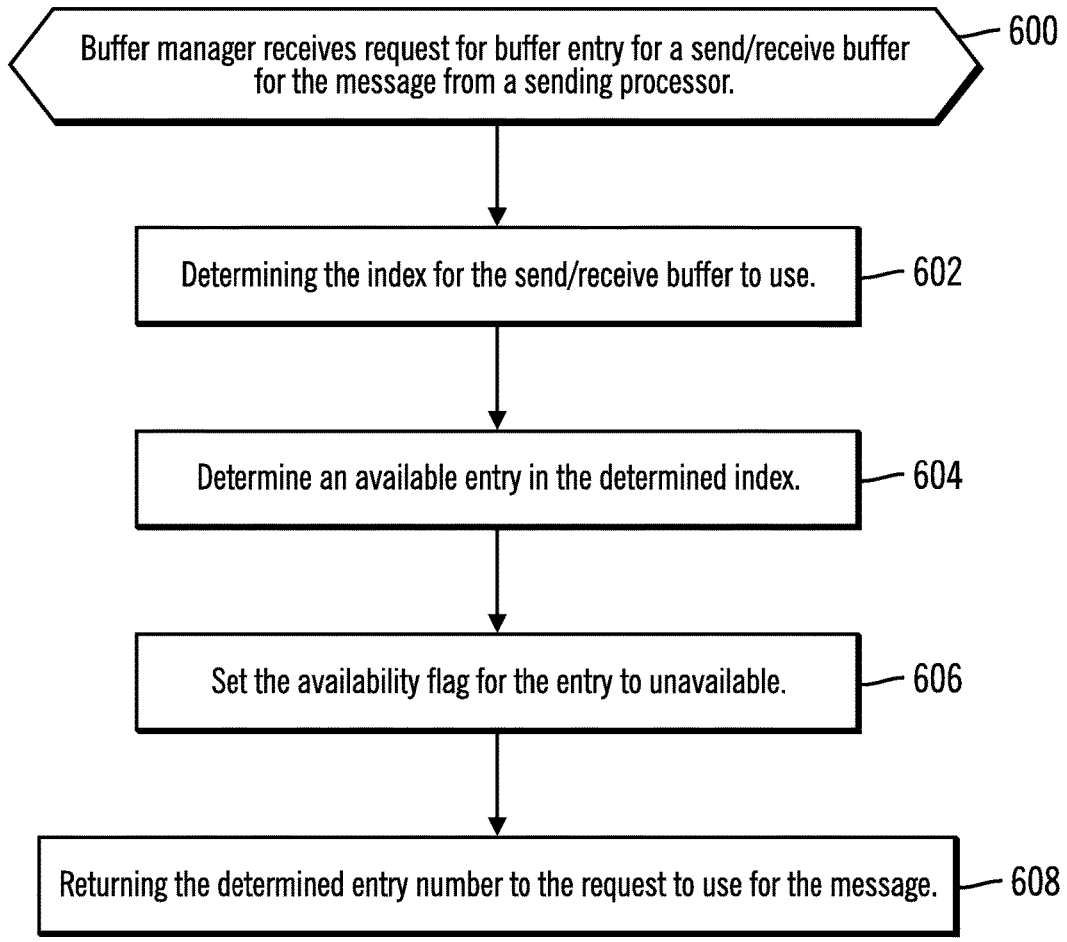
FIG. 6 illustrates an embodiment of operations to determine a buffer entry to use for a message.

FIG. 6 illustrates an embodiment of operations performed by the buffer manager 114 to process a request for a buffer entry from the send message routine 105, such as made at block 504 in FIG. 5. Upon receiving (at block 600) a request for a buffer entry for a send $110s$/receive $110_r$ buffer pair, the buffer manager 114 determines (at block 602) the index 116 for the send buffer $110_s$ to use, which may be indicated at field 210 in the send buffer information 202 for the send buffer $110_s$ that will be used for the message. An available entry $300_i$ in the determined index 116 is determined (at block 604), such as the entry $300_i$ whose availability flag 304 indicates the entry is available. The availability flag 304 for the determined entry is set (at block 606) to indicate unavailable and the determined buffer entry number is returned (at block 608) to the send message routine 105 executing in one of the processors $104_1, 104_2 \ldots 104_m$ to use for the message.

Figure 7:
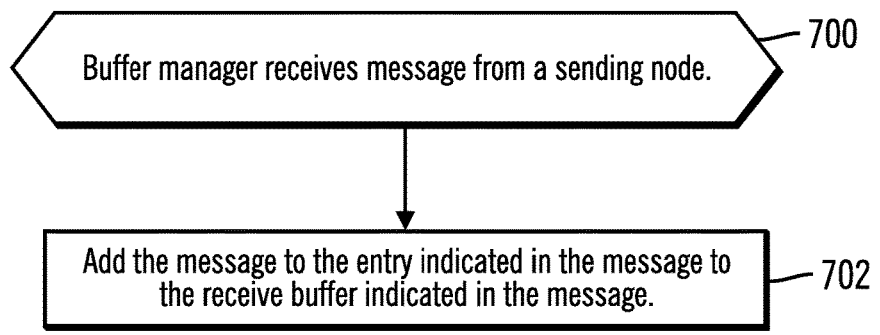
FIG. 7 illustrates an embodiment of operations to process a received message.

FIG. 7 illustrates an embodiment of operations performed by the buffer manager 114 to process a message 400 received from a remote sending node. Upon receiving (at block 700) the message 400 at one of the adaptors $108_1, 108_2 \ldots 108_r$, the message is added (at block 702) to the buffer entry 404 in the receive buffer $112_r$ indicated in field 404 of the message 400. The receiving node $100_r$ will process messages in the receive buffers 112.

Figure 8:
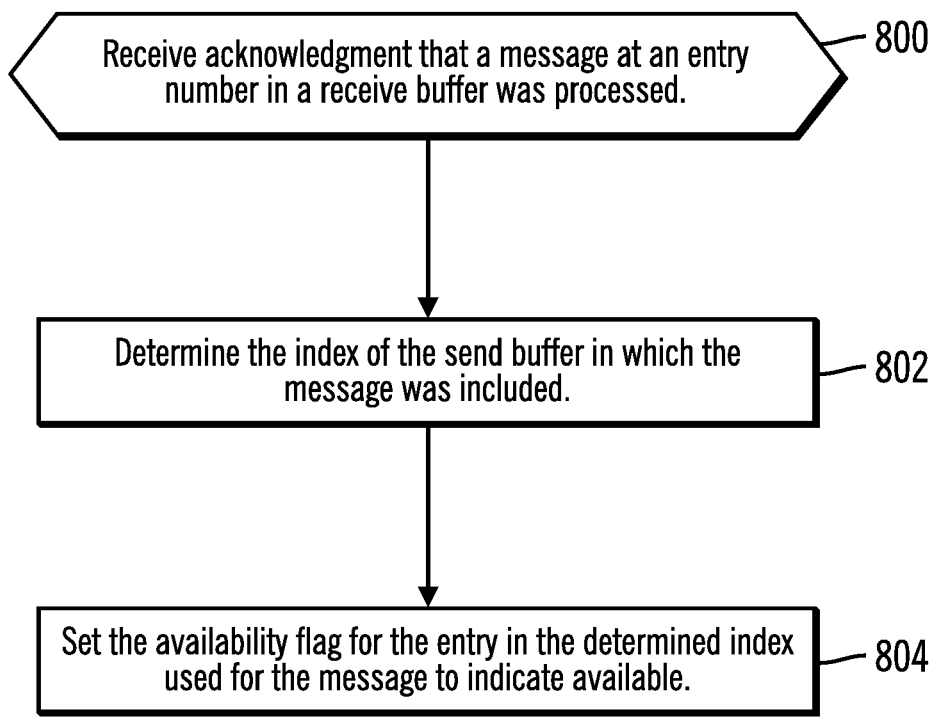
FIG. 8 illustrate an embodiment of operations to process an acknowledgement that a message was processed.

FIG. 8 illustrates an embodiment of operations performed by the buffer manager 114 in response to receiving acknowledgment that a message at an entry number in a receive buffer 112 was processed at the receive node $100_r$. Upon receiving (at block 800) acknowledgment that a message 400 was processed at the receive node $100_r$ in a receive buffer $112_r$ at the receiving node $100_r$, the buffer manager 114 determines (at block 802) the index 116 for the send buffer $110_s$ in which the message was included. The availability flag 304 for the entry $300_i$ in the determined index 116 is set (at block 804) to indicate the entry is available.

Figure 9:
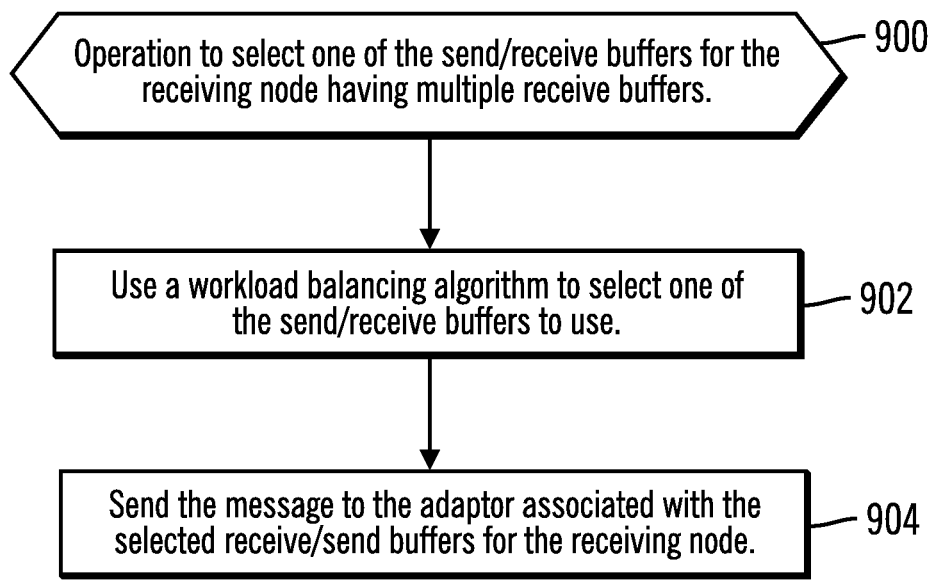
FIGS. 9 and 10 illustrate embodiments of operations to determine a send and receive buffer pair to use for a message.
Figure 10:
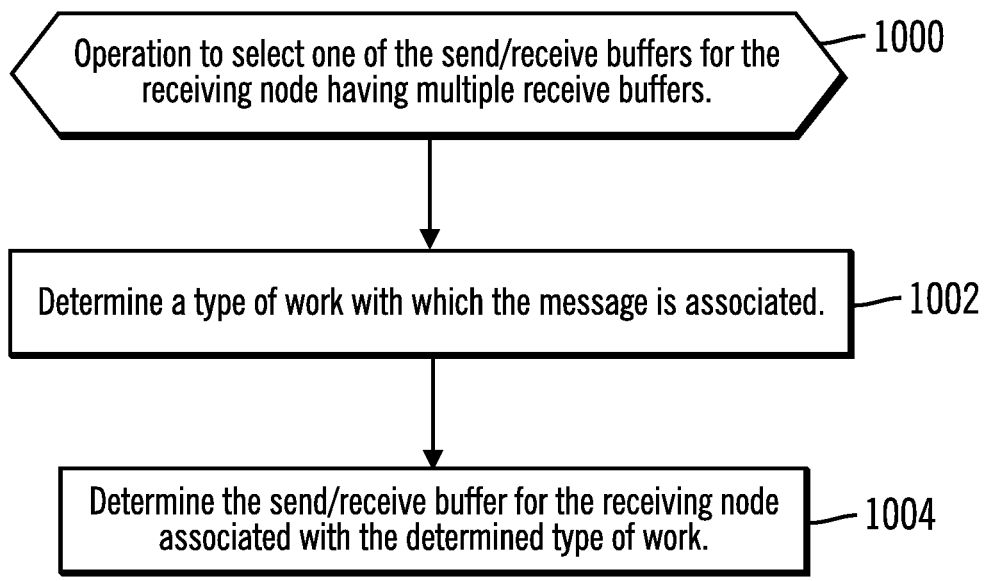

In certain embodiments, there may be multiple send buffers 110 for one receive node $100_r$ to receive the message. In such case, the operation to determine the receive buffer 112 and the corresponding send buffer 110 at block 502 needs to select from multiple possible send and receive buffer pairs to use for the message. For instance, in certain embodiments, each of the send and receive buffer pairs may be associated with one of the adaptors $108_1, 108_2 \ldots 108_t$ at the receive node $100_r$. FIGS. 9 and 10 illustrate different embodiments of operations performed by the send message routine 105, or other component such as the buffer manager 114, for selecting one of multiple send and receive buffer pairs to use to send a message to a receive node $100_r$.

With respect to FIG. 9, upon initiating (at block 900) the operation to select one of the send/receive buffer pairs for the receiving node $100_r$, the send message routine 105 uses (at block 902) a workload balancing algorithm to select one of the send/receive buffers for the receiving node $100_r$ to use, such as round robin selection or by considering other factors such as a workload at the adaptors $108_1, 108_2 \ldots 108_t$ of the receiving node $100_r$. The message 400 built in the send buffer 110 for the selected receive buffer 112 is sent (at block 904) to the adaptor $108_1, 108_2 \ldots 108_t$ at the receiving node $100_r$ associated with the selected send/receive buffer.

With respect to FIG. 10, upon initiating (at block 1000) the operation to select one of the send/receive buffer pairs for the receiving node $100_r$, the send message routine 105 determines (at block 1002) a type of work for which the message is generated, such as for a particular application or service. The send message routine 105 determines (at block 1004) from the work/type receiving node adaptor association 118 the send/receive buffer associated with the determined type of work. The message may then be sent to the adaptor $108_1, 108_2 \ldots 108_t$ at the receiving node $100_r$ associated with the determined send and receive buffer pair.

Described embodiments provide techniques to reduce latency in transmission of messages among nodes in a network by avoiding the need for the processors in a sending node to obtain a lock in order to determine a buffer entry in which the message will be stored in the send buffer and avoiding the need to obtain a lock to send the message from the send buffer. With described embodiments, each of the nodes has a send buffer for each of the nodes to which messages are sent. Each of the nodes includes at least one receive buffer to receive messages from a remote sending node, wherein the send and receive buffers have corresponding entries. These buffers allow the sending node to send a message without having to obtain a lock to determine a buffer entry in which the message will be stored at the remote node or to stage the message in a send buffer from which the message is sent to the remote node.

The letter designators, such as i, j, m, n, r, s, and t used to designate an element and/or a number of instances of an element may indicate a variable number of instances of that element when used with the same or different elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the processors $104_1$, $104_2$ ... $104_m$, may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

Figure 11:
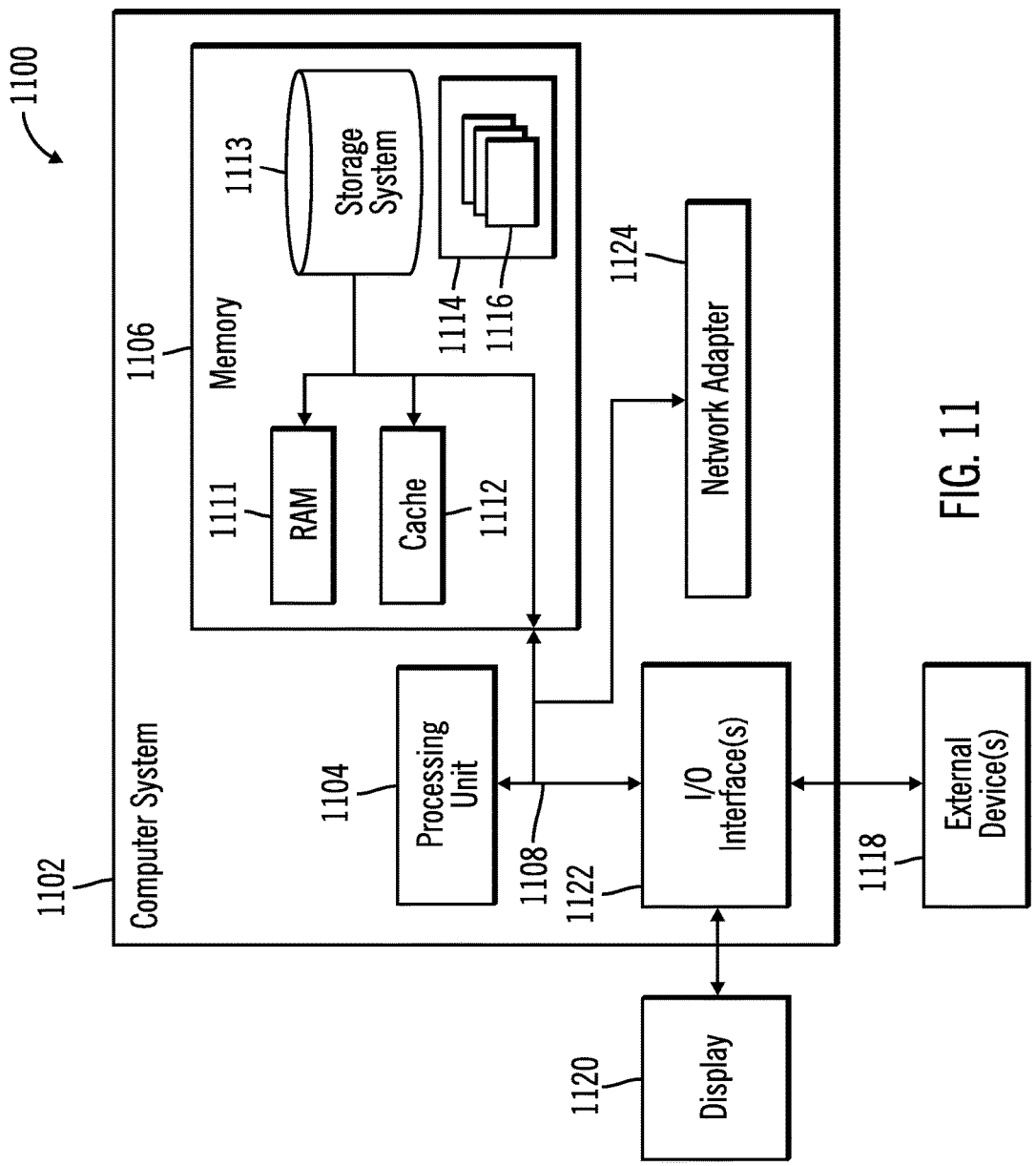
FIG. 11 illustrates a computing environment in which the components of FIG. 1 may be implemented.

As shown in FIG. 11, the computer system/server 1102 is shown in the form of a general-purpose computing device.

The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for transmitting messages among nodes in a network the computer program product comprising a computer readable storage medium having computer readable program code embodied therein that when executed performs sending node operations to send a message to a receiving node comprising at least one of the nodes in the network, the operations comprising:

providing a send buffer for each of at least one receiving node comprising one of the nodes to which messages are sent, wherein each of the at least one receiving node includes at least one receive buffer to receive messages from the send buffer at a sending node, wherein the send and receive buffers for a message being sent from the sending node to one of the receiving nodes have corresponding entries;

requesting from a buffer manager a buffer entry for a send buffer and receive buffer pair for a message, wherein the send buffer is in the sending node and the receive buffer is in the receiving node;

indicating in the message, to send to the receiving node, the buffer entry for the send buffer and the receive buffer pair; and sending, from the send buffer of the sending node, the message to the receiving node indicating the buffer entry to cause the receiving node to include the message in the indicated buffer entry in the receive buffer the receiving node maintains for the node from which the message is sent.

2. The computer program product of claim 1, wherein each of the nodes may operate as a sending node and receiving node, and include send and receive buffers to send and receive messages with respect to other of the nodes.

3. The computer program product of claim 1, wherein the operations further comprise:

receiving indication from the receiving node that the message in the buffer entry in the receive buffer of the receiving node was processed; and indicating as available the buffer entry in the send buffer having the message that was indicated as processed at the receiving node.

4. The computer program product of claim 1, wherein a plurality of processors use the send buffer to send messages to the receiving node, wherein the processors concurrently access available buffer entries in the send buffer to use to send messages to the receive buffer of the receiving node.

5. The computer program product of claim 1, further comprising:

determining, by the buffer manager, a buffer entry for the send buffer and receive buffer pair that is available;

indicating, by the buffer manager, the determined buffer entry as unavailable; and returning the determined buffer entry to use for the message.

6. The computer program product of claim 1, wherein there are a plurality of send buffers corresponding to a plurality of receive buffers at the receiving node, wherein the operations further comprise:

selecting one of the send buffers, wherein the buffer entry in which the message is indicated is for the selected send buffer, wherein the receiving node stores the message in the receive buffer corresponding to the selected send buffer.

7. The computer program product of claim 6, wherein the operations further comprise:

using a load balancing algorithm to select one of the send buffers to use for the message.

8. The computer program product of claim 6, wherein the operations further comprise:

associating each of a plurality of different types of work with each of the send buffers, wherein the selecting one of the send buffers comprises determining a type of work of the different types of work with which the message is associated, wherein the selected send buffer comprises the send buffer associated with the determined type of work.

9. The computer program product of claim 6, wherein each of the send buffers for the receiving node correspond to one of a plurality of adaptors on the receiving node, wherein the message is sent to the adaptor of the receiving node corresponding to the selected send buffer.

10. The computer program product of claim 9, wherein the operations further comprise:
associating each of a plurality of different types of work with one of the adaptors at the receiving node, wherein the selecting one of the send buffers comprises determining a type of work of the different types of work with which the message is associated, wherein the selected send buffer comprises the send buffer corresponding to an adaptor associated with the determined type of work.

11. A system for transmitting messages among nodes in a network, comprising:
at least one processor; and
a computer readable storage medium having computer program code executed by the processor to perform operations as a sending node to send message in the network to other nodes comprising receiving nodes, the operations comprising:
providing a send buffer for each of at least one receiving node comprising one of the nodes to which messages are sent, wherein each of the at least one receiving node includes at least one receive buffer to receive messages from the send buffer at the sending node, wherein the send and receive buffers for a message being sent from the sending node to one of the at least one receiving node have corresponding entries;
requesting from a buffer manager a buffer entry for a send buffer and a receive buffer pair for a message, wherein the send buffer is in the sending node and the receive buffer is in a receiving node;
indicating in the message, to send to the receiving node, the buffer entry for the send buffer and the receive buffer pair; and
sending, from the send buffer of the sending node, the message to the receiving node indicating the buffer entry to cause the receiving node to include the message in the indicated buffer entry in the receive buffer the receiving node maintains for the node from which the message is sent.

12. The system of claim 11, wherein each of the nodes may operate as a sending node and receiving node, and include send and receive buffers to send and receive messages with respect to other of the nodes.

13. The system of claim 11, wherein the at least one processor comprises a plurality of processors that use the send buffer to send messages to the receiving node, wherein the processors concurrently access available buffer entries in the send buffer to use to send messages to the receive buffer of the receiving node.

14. The system of claim 11, further comprising:
determining, by the buffer manager, a buffer entry for the send buffer and receive buffer pair that is available;
indicating, by the buffer manager, the determined buffer entry as unavailable; and
returning the determined buffer entry to use for the message.

15. The system of claim 11, wherein there are a plurality of send buffers corresponding to a plurality of receive buffers at the receiving node, wherein the operations further comprise:
selecting one of the send buffers, wherein the buffer entry in which the message is indicated is for the selected send buffer, wherein the receiving node stores the message in the receive buffer corresponding to the selected send buffer.

16. The system of claim 15, wherein each of the send buffers for the receiving node correspond to one of a plurality of adaptors on the receiving node, wherein the message is sent to the adaptor of the receiving node corresponding to the selected send buffer.

17. A method for transmitting messages among nodes in a network, comprising:
providing a send buffer for each of at least one receiving node comprising one of the nodes to which messages are sent, wherein each of the at least one receiving node includes at least one receive buffer to receive messages from the send buffer at a sending node, wherein the send and receive buffers for a message being sent from the sending node to one of the receiving nodes have corresponding entries;
requesting from a buffer manager a buffer entry for a send buffer and receive buffer pair for a message, wherein the send buffer is in the sending node and the receive buffer is in the receiving node;
indicating in the message, to send to the receiving node, the buffer entry for the send buffer and the receive buffer pair; and
sending, from the send buffer of the sending node, the message to the receiving node indicating the buffer entry to cause the receiving node to include the message in the indicated buffer entry in the receive buffer the receiving node maintains for the node from which the message is sent.

18. The method of claim 17, wherein each of the nodes may operate as a sending node and receiving node, and include send and receive buffers to send and receive messages with respect to other of the nodes.

19. The method of claim 17, wherein there are a plurality of processors that use the send buffer to send messages to the receiving node, wherein the processors concurrently access available buffer entries in the send buffer to use to send messages to the receive buffer of the receiving node.

20. The method of claim 17, further comprising:
determining, by the buffer manager, a buffer entry for the send buffer and receive buffer pair that is available;
indicating, by the buffer manager, the determined buffer entry as unavailable; and
returning the determined buffer entry to use for the message.

21. The method of claim 17, wherein there are a plurality of send buffers corresponding to a plurality of receive buffers at the receiving node, further comprising:
selecting one of the send buffers, wherein the buffer entry in which the message is indicated is for the selected send buffer, wherein the receiving node stores the message in the receive buffer corresponding to the selected send buffer.

22. The method of claim 21, wherein each of the send buffers for the receiving node correspond to one of a plurality of adaptors on the receiving node, wherein the message is sent to the adaptor of the receiving node corresponding to the selected send buffer.

\* \* \* \* \*